United States Patent [19]
Underwood

[11] 4,131,254
[45] Dec. 26, 1978

[54] WIDE INSTANTANEOUS DYNAMIC RANGE PROPORTIONAL SIGNAL PROCESSOR

[75] Inventor: William C. Underwood, Orlando, Fla.

[73] Assignee: Martin Marietta Corporation, Orlando, Fla.

[21] Appl. No.: 678,508

[22] Filed: Apr. 19, 1976

Related U.S. Application Data

[63] Continuation of Ser. No. 181,616, Sep. 17, 1971, abandoned.

[51] Int. Cl.² .......................... F41G 7/00; F41G 7/18; G01S 9/02
[52] U.S. Cl. ................................ 244/3.16; 343/16 R; 343/16 M
[58] Field of Search ................. 244/3.16, 317; 343/16, 343/16 M

[56] References Cited

U.S. PATENT DOCUMENTS

| | | | |
|---|---|---|---|
| 3,012,222 | 12/1961 | Hagemann | 343/16 R |
| 3,064,252 | 11/1962 | Varela | 343/16 R |
| 3,089,136 | 5/1963 | Albersheim | 343/16 M |
| 3,342,984 | 9/1967 | Gray et al. | 364/820 |

FOREIGN PATENT DOCUMENTS

| | | |
|---|---|---|
| 720345 | 12/1954 | United Kingdom. |
| 1029791 | 5/1966 | United Kingdom. |
| 1070938 | 6/1967 | United Kingdom. |

OTHER PUBLICATIONS

Introduction to Monopulse pp. 50-51 (1959).
Analog Computation by Albert S. Jackson, pp. 482 to 489, McGraw-Hill Book Co., Inc. (1960).

Primary Examiner—Samuel W. Engle
Assistant Examiner—Thomas H. Webb
Attorney, Agent, or Firm—Julian C. Renfro; Gay Chin; James B. Eisel

[57] ABSTRACT

A proportional processing technique having a wide instantaneous dynamic range and providing a significant increase in instantaneous dynamic range over presently known proportional processing methods. These improvements are made possible by the use in accordance with this invention of a logarithmic amplifier in each channel of a pair of channels relatable to the same sensing plane. Each logarithmic amplifier is preferably arranged to operate substantially at the midpoint of its operating characteristic, and the pair of channels may be orthogonally related to another pair of channels, such that suitable guidance commands can be derived and furnished for example to a missile.

23 Claims, 3 Drawing Figures

WIDE INSTANTANEOUS DYNAMIC RANGE PROPORTIONAL SIGNAL PROCESSOR

This is a Continuation of application Ser. No. 181,616, filed Sept. 17, 1971 now abandoned.

BACKGROUND OF THE INVENTION

It is important to realize that in the operation of a laser seeker, two types of signal level variations exist. One of these is the variation of the average input signal level with range, and the other is a change in instantaneous signal level due to scintillation, foreground objects, etc.

Laser Seeker signal processors conventionally employed for proportional tracking utilize linear signal amplification of a type which limits the total instantaneous dynamic range to approximately 20 db, or $\pm 10$ db about the average pulse amplitude. However, the scintillation in the reflected laser energy from a target caused by missile and illuminator aiming motion can cause pulse to pulse amplitude variations exceeding 20 db. The resulting saturation or dropping of pulses will reduce the data rate and degrade guidance accuracy. In addition, terrain masking can occur, which is responsible for creating false pulses and preventing a large percentage of the energy from reaching the target.

In several instances, during field tests of laser illuminated tactical targets, a 25 db variation from pulse to pulse was observed due to scintillation and terrain masking. Under these conditions the 20 db instantaneous dynamic range of a conventional proportional processor will cause pulses to be lost with the resultant degradation in accuracy.

Further, with conventional processing equipment, it is possible to get a series of returns, such as from foreground bushes or other objects, which will have the effect in signal processors of limited dynamic range of causing the signal processor to track the false return. It will be seen that if a false pulse arrives earlier than the true pulse and is of a higher amplitude, if the false pulse is greater than ½ of the instantaneous dynamic range than the true pulse, then the system may lock upon the false target. If this type of situation is to be avoided, the signal processor must have a wide instantaneous dynamic range.

SUMMARY OF THE INVENTION

In accordance with the present invention, I have provided a signal processor having an instantaneous dynamic range of $\pm 30$ db, which enables my system to distinguish true target returns from false ones. Whereas previous proportional type signal processors were of limited capability, the present invention makes possible an instantaneous dynamic range of 60 db or greater in a proportional system, and accurate tracking information will be provided when pulse to pulse variations are as great as $\pm 30$ db from the average signal level. The instantaneous dynamic range of my invention is to a large extent determined by the dynamic range capability of a logarithmic amplifier utilized in the amplification arrangement of each channel of my device. However, even a logarithmic amplifier may not by itself have sufficient dynamic range to cope with signal variation due to scintillation when this is superimposed with variation due to range closure changes.

Accordingly, I use an AGC arrangement that enables the amplification arrangement to operate about the middle of its linear range, which makes it possible with a 60 db logarithmic amplifier to handle a pulse to pulse variation equivalent to the square root of 1,000, which is about 31.6 to 1.

It is to be noted that normalization previously obtained only by the use of additional circuitry is inherently accomplished in accordance with the present invention by taking the quotient of the logarithm of the up and down channels, which produces a steering command voltage whose slope is independent of signal level.

As should now be apparent, the distinct advantage of extremely wide dynamic range is thus obtained by the utilization of the logarithmic amplifiers, while at the same time, circuit complexity and cost are reduced inasmuch as normalization of the guidance signal is inherent in the signal processing utilized in accordance with this invention, thereby eliminating the discrete normalization circuits previously needed. A further cost reduction results from the fact that matched gains or tracking in the video amplifiers is required between only two channels rather than necessitating a matching between four channels as required in present proportional processors.

Thus, wide instantaneous dynamic range in accordance with this invention, in conjunction with last pulse logic, will allow my signal processor to track the true target even though the true target is 30 db lower than an earlier false pulse.

It is therefore a primary object of the present invention to provide a signal processor having extremely wide dynamic range.

It is another object of this invention to provide a signal processor for use in conjunction with laser illuminators and the like for proportional tracking, which provides an instantaneous dynamic range of 60 db or greater.

It is yet another object of this invention to provide a signal processor having increased dynamic range obtained with reduced circuit complexity.

It is still another object of this invention to provide a signal processor of reduced complexity and cost, made possible because the normalization of the guidance signal is inherent in the signal processing technique utilized.

These and other objects, features and advantages will be more apparent from a study of the drawings in which.

DETAILED DESCRIPTION

Figure 1:
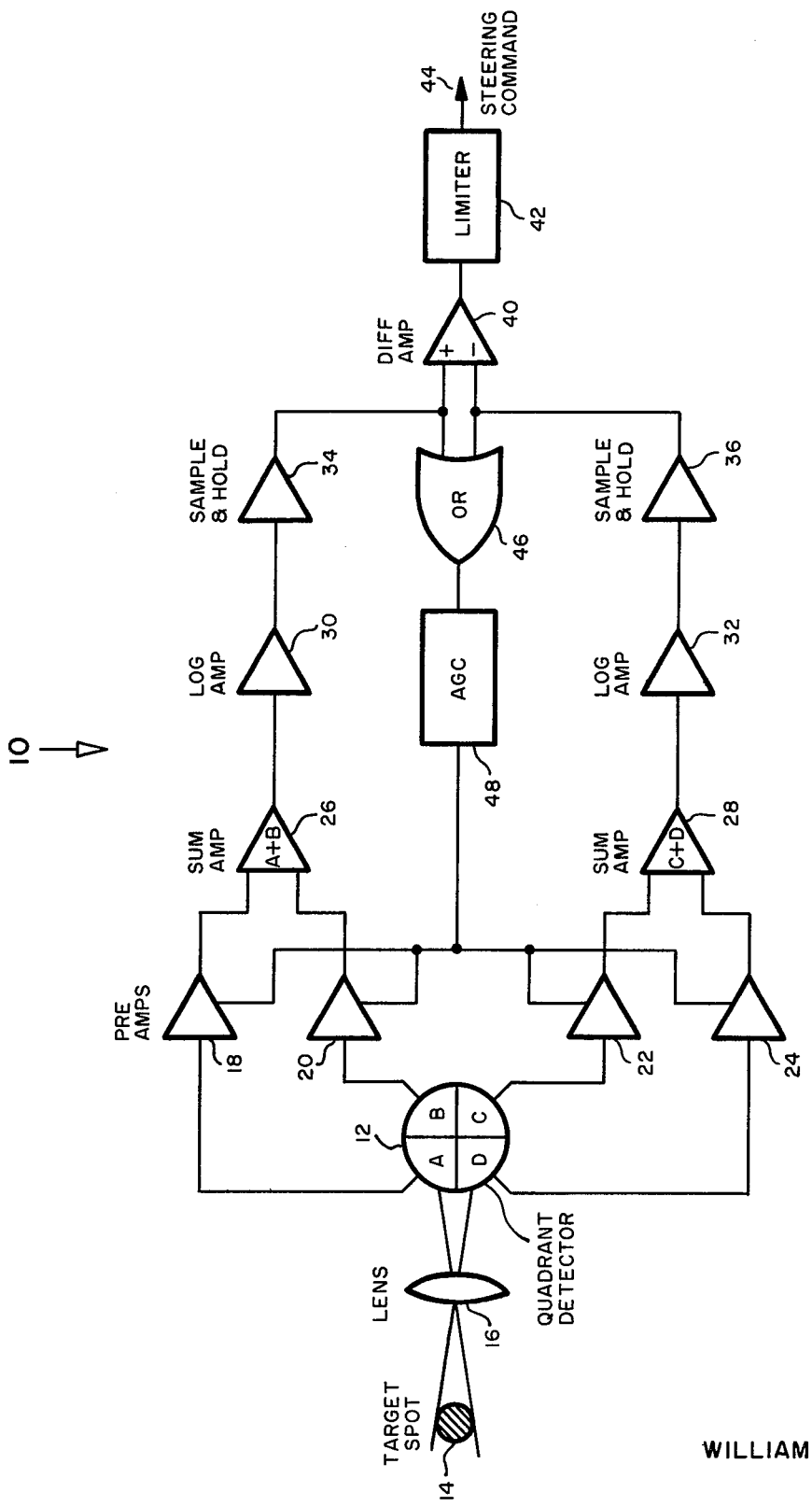
FIG. 1 is a somewhat simplified block diagram illustrating my novel signal processor in conjunction with a more or less conventional quadrant detector.

Turning now to FIG. 1, I have there revealed a typical embodiment of my signal processor 10, which is shown operatively associated with a detector 12. The detector is disposed in such a position that light from, for example, a laser illuminated target 14 is imaged thereon as a defocused spot by means of a suitable optical system, represented here by a lens 16. The detector 12 may be a four quadrant PIN diode, utilizing quadrants identified as A, B, C, & D, reading in a clockwise direction. As will be understood, my signal processor may be used as an intrinsic part of a seeker head of a missile, for example, but is obviously not to be so limited. As an example, the detector may relate to use with a non-optical arrangement, such as an RF direction finder in which the incoming signal is detected by four directional antennas. Thus, an embodiment of my invention can use either a quadrant type detector as illustrated, or can use four related but separate detectors.

My signal processor will be explained in conjunction with a pair of channels related to the same sensing plane, such as with the channels concerned with the derivation of up-down commands. The channels shown in FIG. 1 provide a pitch guidance signal proportional to the vertical displacement of the defocused spot from the center of the detector, and in accordance with the teachings of the present invention, pitch error is equal to Log (A+B) minus Log (C+D). However, it is to be understood that the signal processor for the orthogonally related channel is essentially identical, except that of course the yaw error is equal to Log (A+D) minus Log (B+C). The processor for the left-right channels therefore does not need to be separately treated here.

It will be seen in FIG. 1 that the output signals from quadrants A, B, C and D are delivered to respective preamplifiers 18, 20, 22 and 24, each of which has a bandwidth of 25 megacycles. Incorporated in each preamplifier is a diode attenuator network that makes gain control possible. The signal handling range of each preamplifier is 60 db, with the AGCing of the diode attenuators in a manner described hereinafter affording an additional 90 db of gain control.

FIG. 1 further reveals that the outputs of preamplifiers 18 and 20 are summed in a linear summing amplifier 26, the bandwidth of which is 35 megacycles and the gain of which is unity. Similarly, the outputs of preamplifiers 22 and 24 are summed in a linear summing amplifier 28, the characteristics of which are identical to those of summing amplifier 26.

The outputs from summing amplifiers 26 and 28 are respectively applied to logarithmic amplifiers 30 and 32, the gain characteristics of which may for example be logarithmic over a 60 db dynamic range. The utilization of logarithmic amplifiers is of key importance to my signal processor in that the function they provide to the circuit to a large extent makes possible the wide dynamic range capability of my device, but the log amps per se are not a part of my invention, and may for example be of integrated circuit construction, such as are obtainable from Texas Instruments and others. Thus, the use herein of amplifier means including log amps makes possible the amplification of a wide range of signal levels.

The output from log amps 30 and 32 is respectively connected to sample and hold circuits 34 and 36, where the short duration pulses, such as 15 nanosecond pulses from a laser, may be stretched to hold a constant value between consecutive pulses. The sample and hold circuits are preferably known devices of a two stretch type, that serve to stretch the pulses from the nanosecond to the millisecond region in accordance with conventional practice.

Figure 2:
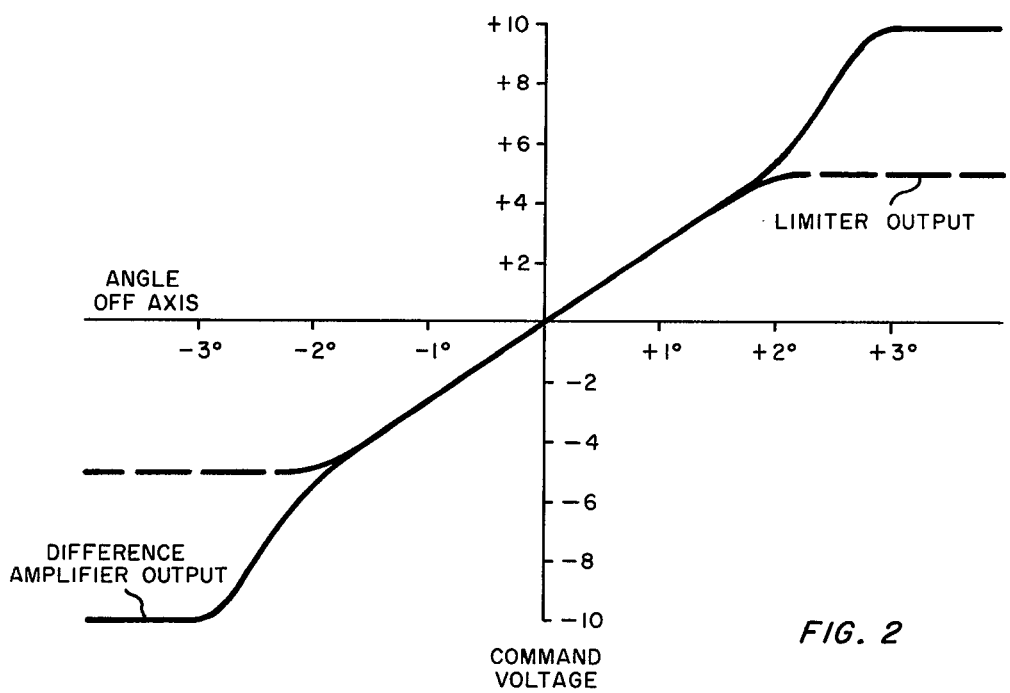
FIG. 2 is a graph which shows the steering command voltage produced by the present invention as a function of target motion about the optical system boresight axis.

Steering commands are developed by now taking the difference of the two sample and hold outputs, this being accomplished by connecting the sample and hold devices 34 and 36 to a difference amplifier 40, the output of which is linear over an angular region of the detector 12 corresponding to ⅔ of the radius of the defocused spot. The output from the difference amplifier is delivered to a limiter 42 in order to provide a steering command at output 44 of constant amplitude beyond the ⅔ radius point. FIG. 2 reveals the clamping of the signal at an appropriate location to provide a constant amplitude steering command beyond the linear region.

The outputs of the sample and hold circuits 34 and 36 are also applied to an OR gate 46 and thence to AGC 48 in order to develop an AGC voltage. A hold off bias is applied in the OR gate so that the average signal level rises 30 db above threshold (⅓ of the logarithmic range of the amplifiers prior to the development of any AGC voltage). After the AGC threshold is reached, the AGC output voltage is fed from 48 back to the four preamplifiers 18, 20, 22 and 24 as shown in FIG. 1 in order to maintain the output of the sample and holds at a constant value. This AGC is effective over an additional 90 db of dynamic range.

The AGC arrangement serves to hold the average signal strength in the middle of the log amp dynamic range by suitably changing the gain of the preamps. This gain change can be accomplished for example by the use of a diode attenuator network, as previously mentioned. Typically, if a 60 db instantaneous dynamic range is required, a 30 db threshold would be employed in the AGC. No AGC would be developed through the OR gate 46 until the stronger of the two channels exceeds 30 db above threshold. The AGC would then be applied to the linear amplifiers to maintain the average pulse amplitude at the midpoint of the 60 db log amp dynamic range. Pulse to pulse variations of ±30 db could thus occur without affecting the accuracy of the proportional tracking signal.

The instantaneous dynamic range of my design is dictated by the ratio of the main lobe to side lobe energy of the target illuminator. With present day state of the art laser illuminators, an instantaneous dynamic range of greater than ±30 db might well result in the processor tracking false targets created by side lobe energy. An AGC system is therefore highly desirable in conjunction with the log amp dynamic range, to cover the 120 db total dynamic range required by most laser seekers. However, a total log amplifier range of 120 db is possible with the present state of the art, and if used, would eliminate the need for the AGC arrangement.

In operation, energy reflected from the target 14 is received through the optical system and imaged onto the four quadrant detector 12. The signal from each quadrant is amplified in a linear manner by the respective preamplifiers 18 through 24. The signals from the A and B quadrants are summed in the summing amplifier 26, applied to the log amplifier 30, and the pulse output from the log amplifier representing the logarithm of the (A+B) sum signal is then stretched to one inter pulse period in the sample and hold circuit 34. Similarly, the signals from the C and D quadrants are amplified to the preamps 22 and 24, combined in the summing amplifier 28, and applied to the log amplifier 32. The output of the log amplifier representing the logarithm of the (C+D) sum signal is then stretched in the sample and hold circuit 36 for one inter pulse period.

The difference in the sample and hold outputs is then taken in the difference amplifier 40, coupled through the limiter 42, which then produces at 44 the steering command for the up/down channel. As the missile closes on the target, the average signal level at the output of the sample and holds 34 and 36 will increase and when it reaches a point 30 db above threshold, the biased diodes in the OR gate 46 will couple a signal to the AGC 48, which will be fed back to the preamps 18 through 24 in such a manner as to maintain the larger of the sample and hold outputs at a constant amplitude. Most importantly, therefore, the output of the sample and holds is held constant at the midpoint of the logarithmic range of the log amps, despite range closure.

The signal may therefore vary on a pulse-to-pulse basis by a factor of ±30 db from the average value once the AGC threshold has been reached, without loss of signals. This enables, through utilization of last pulse logic, my seeker to develop accurate guidance information, even in the presence of scintillation that produces large pulse-to-pulse signal variations, or even in the presence of terrain masking, which produces false signal returns which may be as much as 30 db greater than the true target return.

Last pulse logic develops the steering information from the last signal energy which exceeds the threshold sensitivity of the system. Each pulse which exceeds the threshold is processed and stored in the sample and hold circuits. A succeeding pulse discharges the steering information stored in the sample and hold from the previous pulse, and therefore produces a steering command from the last pulse only.

Inherent also in the processing technique in accordance with this invention is the implementation of the steering commands so that the steering command voltage which is proportional to the angle between the optical axis and target bearing remains constant over a range of signals of ±30 db about the average value.

The normalization technique inherent in this implementation is accomplished by taking the quotient of the logarithm of the up and down channels, which produces a steering command voltage whose slope is independent of signal level. Significantly, as taught herein, the number of parts required in order to obtain normalization is appreciably reduced from the number required in the usual normalization procedures, which necessitated taking A + B, subtracting C + D, and then dividing by the sum of A + B + C + D.

My signal processing technique is capable of use in other applications, such as in a monopulse R.F. direction finder. In an RF direction finder each of the quadrants of the detector would be replaced by an antenna and RF detector. The processing procedure would be very close to that shown herein.

The proportional steering command which is produced by my signal processing technique is shown in FIG. 2. This steering command signal which is linear over a region of ±2° about the boresight axis was produced by a system using a 3° radius defocused spot. The defocused spot size may be varied to obtain the desired linear region. The solid curve is the steering command produced at the output of the difference amplifier 40 as the target is positioned so as to move the defocused spot on the detector over a region of ±3° about the boresight axis. FIG. 2 shows that the steering command voltage is linear with angle over a region which is approximately ⅔ of the defocused spot size, or ±2°. The steering command is therefore restricted to the linear region by means of limiter 42 which limits the difference amplifier output 40 to +5 volts beyond the +2° angle and to −5 volts beyond the −2° angle, as shown by the dashed curve in FIG. 2.

A further advantage resulting from the inherent configuration of my signal processing technique is that the steering command signal is normalized, that is, the slope of the steering command voltage vs. angle off axis is independent of the target signal strength over the full dynamic range of the logarithmic amplifier. If the target is moved off the boresight axis by a given amount, for example 1°, the ratio of the target signal powers produced in the A + B and C + D channels is constant and is independent of target signal level. The difference in the logarithms of the two constant ratio pulses (the difference of log amp 30 and 32 outputs as measured by difference amplifier 40) is a constant voltage which is independent of the absolute value of the signal pulses. The slope of the resulting steering command 44 produced at the output of limiter 42 is therefore independent of target signal level and a normalized steering command signal is obtained with a significant simplification in circuit complexity over the conventional normalization technique.

The primary advantage of my signal processing technique is the improved guidance accuracy resulting from a wide instantaneous dynamic range in a proportional tracking system. Large pulse to pulse signal variations occur in both RF and optical seeker systems because of scintillation and/or terrain masking as in the case of a moving target illuminated by a ground or airborne mounted laser. Variations also occur in the pulse to pulse output from present state-of-the-art lasers. Target signature measurements of tactical laser illuminated targets revealed variations approaching ±30 db. The limited dynamic range of present generation proportional laser seekers, usually ±10 db, will result in reduced guidance accuracy through reduced data rate (individual pulses falling below the threshold level) or saturated pulses (individual pulses exceeding the linear range).

Figure 3:
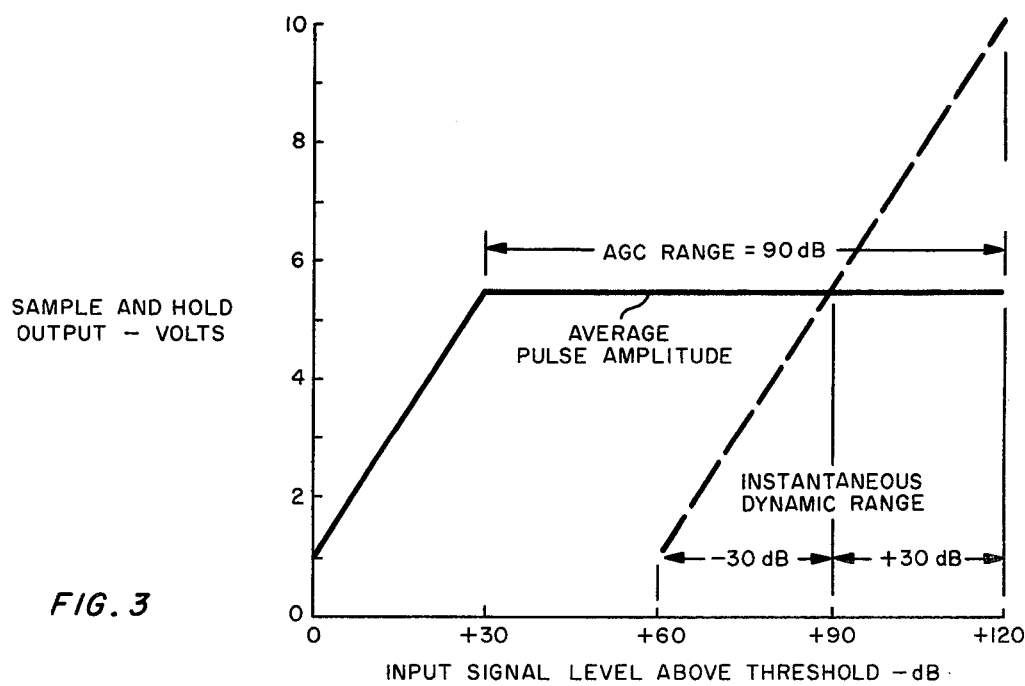
FIG. 3 is a graph which shows the relation between the received target energy level and the sample and hold output level as controlled by the AGC system.

In order to utilize the ±30 db dynamic range offered by my signal processing method, an AGC system must be employed which maintains the average signal amplitude at the midpoint of the instantaneous dynamic range. The AGC characteristic for my signal processing method is shown in FIG. 3. The output of the sample and hold outputs 34 and 36 arises from the threshold value of 1 volt to 5.5 volts (+30 db above threshold) as the seeker closes on the target. The OR circuit 46 bias is exceeded at a sample and hold output voltage of 5.5 volts and the AGC 48 develops a gain control voltage which is fed back to the diode attenuator networks in the preamps 18 through 24. The output from the larger of the sample and hold outputs, represented by the horizontal line in FIG. 3, is held at 5.5 volts for an additional increase of 90 db. The instantaneous pulse amplitude, represented by the sloped line in FIG. 3, may therefore vary by ± 30 db from the average value without loss of accuracy once the average signal strength has risen 30 db above threshold. For illustration the instantaneous load line of ±30 db is drawn at the +90 db signal level above threshold point in FIG. 3. This instantaneous operating line actually progresses from the +30 db above threshold point toward the higher signal levels as the seeker closes on the target.

An instantaneous dynamic range of ±30 db and total dynamic range of 120 db are used for illustration only. The instantaneous dynamic range and total dynamic range may be varied to meet application requirements.

As should now be apparent, I have provided a highly advantageous logarithmic proportional signal processor admirably suited for use with laser seekers, in that it provides a significant increase in dynamic range, accomplished by circuitry whose cost and complexity are considerably reduced from the ordinary. Because the signal outputs are the logarithm of the signal inputs, the slope of the steering command is independent of input signal amplitude, and normalization is inherent. It should further be noted that for each factor of 10 increase in power, I obtain the same Δ in the output voltage.

Significantly, my device thus produces, independent of the absolute signal level represented by the defocused spot, a steering command whose slope (volts vs. degrees off axis) is constant for a given angular displacement of the defocused spot away from the midpoint of the detector, with this being true irrespective of whether the input is near the threshold, or at the upper end of the dynamic range, which of course may be a value one million times greater.

A preferred embodiment of my invention may involve a signal processor having a wide instantaneous dynamic range and usable in conjunction with a pair of channels relatable to the same sensing plane, comprising detector means, and at least one pair of channels arranged to receive outputs from said detector means. Amplifier means including a logarithmic amplifier are operatively disposed in each of the channels, which are arranged to receive the respective outputs of said detector means and function to amplify a wide range of signal levels. Difference amplifier means are provided for producing a signal whose polarity is indicative of the channel having the higher output, such that appropriate commands can be generated.

Either one or two pairs of channels can be utilized, and if two pairs are employed, the plane of one pair of channels is orthogonal to the plane of the other pair of channels, thus making it possible to generate steering commands usable for controlling the movement of a vehicle, such as a missile or the like.

The signal processor may utilize automatic gain control means, latter means being operative for selectively changing the gain of said amplifier means such that the logarithmic amplifier of each channel can function substantially at the midpoint of its operating characteristic. Sample and hold means may also be utilized in each channel, for converting pulse type signal outputs into signals of longer duration, thus to provide sufficient time for the comparison by said difference amplifier means of the outputs of said channels. Limiter means may be provided for limiting the output of the difference amplifier means to a preselected voltage level.

It should be now be apparent that normalization is inherent in my invention, in that the difference amplifier provides a steering command having a slope representing voltage versus target bearing off boresight, that is independent of input signal level.

I claim:

1. A signal processor having a wide instantaneous dynamic range and usable in conjunction with a pair of channels relatable to the same sensing plane, comprising detector means, at least one pair of channels connected to receive outputs from said detector means, amplifier means including a logarithmic amplifier operatively disposed in each of said channels, connected to receive the respective outputs of said detector means and functioning to amplify a wide range of levels of signals, and difference amplifier means connected to receive the output of said channels, and serving to produce a signal the polarity of which is indicative of the channel having the higher output, such that appropriate commands can be generated, and sample and hold means in each channel and utilized for converting pulse type signal outputs into signals of longer duration, thus to provide sufficient time for the comparison by said difference amplifier means of the outputs of said channels.

2. The signal processor as defined in claim 1 in which said detector means is a quadrant type optical detector.

3. The signal processor as defined in claim 1 in which said detector means is a radio frequency antenna array.

4. The signal processor as defined in claim 1 in which said difference amplifier means provides a signal output having an amplitude proportional to the magnitude of the difference existent in the outputs of said channels.

5. The signal processor as defined in claim 1 in which last pulse logic means are provided for discharging the sample and hold outputs of previous pulse data signals when a succeeding pulse occurs which exceeds the threshold of said logarithmic amplifier so as to insure that the signal processor will ignore false targets and guide to the last pulse occurring only on a true target.

6. The signal processor as defined in claim 1 incorporating an automatic gain control means for providing last significant pulse logic by maintaining the average target signal amplitude at a desired operating point of the instantaneous dynamic range of said logarithmic amplifier so that low level signals are rejected because they fall below the lower limit of the instantaneous dynamic range of said logarithmic amplifier.

7. The signal processor as recited in claim 6 in which means are provided for furnishing a holdoff bias preventing the development of automatic gain control until the average target signal amplitude reaches an operating point located substantially at the midpoint of the instantaneous dynamic range of said logarithmic amplifier.

8. The signal processor as defined in claim 1 in which said signal processor is used for target tracking utilizing a laser illuminator which has main lobe energy and side lobe energy, said signal processor being intended to track a target illuminated by the main lobe energy and to reject apparent targets created by the side lobe energy, and automatic gain control means utilized to provide last significant pulse logic by maintaining the average target signal amplitude at a desired operating point of the instantaneous dynamic range of said logarithmic amplifier so that insignificant level signals created by side lobe energy of the target illuminator which may occur later in time than the true target return, are rejected because they fall below the lower limit of the instantaneous dynamic range of said logarithmic amplifier.

9. The signal processor as recited in claim 8 in which means are provided for furnishing a hold off bias preventing the development of automatic gain control until the average target signal amplitude reaches an operating point located substantially at the midpoint of the instantaneous dynamic range of said logarithmic amplifier.

10. A signal processor having a wide instantaneous dynamic range and usable in conjunction with a pair of channels relatable to the same sensing plane, comprising detector means, at least one pair of channels connected to receive outputs from said detector means, amplifier means including a logarithmic amplifier operatively disposed in each of said channels, connected to receive the respective outputs of said detector means and functioning to amplify a wide range of levels of signals, difference amplifier means connected to receive the output of said channels, and serving to produce a signal the polarity of which is indicative of the channel having the higher output, such that appropriate commands can be generated, and limiter means for limiting the output of said difference amplifier means to a preselected voltage level.

11. The signal processor as defined in claim 10 in which said difference amplifier means produces an output signal the amplitude of which is proportional to the magnitude of the difference of the outputs of said channels.

12. A proportional signal processor having a wide instantaneous dynamic range and usable in conjunction with a pair of channels relatable to the same sensing plane, comprising detector means for sensing the bearing of a target, at least one pair of channels arranged to receive outputs representing target position from said detector means, amplifier means including a logarithmic amplifier operatively disposed in each of said channels arranged to receive respective outputs of said detector means and functioning to amplify a wide range of levels of signals, difference amplifier means connected to receive the output of said channels, and serving to produce a steering command the polarity of which is indicative of the channel having the higher output, such steering command having a slope representing volts versus target bearing that is independent of input signal level, thus inherently accomplishing normalization, said signal processor also utilizing sample and hold means in each channel for converting pulse type signal outputs into signals of longer duration, thus to provide sufficient time for the comparison by said difference amplifier means of the outputs of said channels.

13. The signal processor as defined in claim 12 in which last pulse logic means are provided for discharging the sample and hold outputs of previous pulse data signals when a succeeding pulse occurs which exceeds the threshold of said logarithmic amplifier, so as to insure that the signal processor will ignore false targets and guide to the last pulse occurring only on a true target.

14. A proportional signal processor having a wide instantaneous dynamic range and usable in conjunction with a pair of channels relatable to the same sensing plane to process pulse signals, comprising detector means for sensing the bearing of a target, at least one pair of channels arranged to receive outputs representing target position from said detector means, amplifier means including a logarithmic amplifier operatively disposed in each of said channels, arranged to receive the respective outputs of said detector means and functioning to amplify a wide range of levels of signals, sample and hold circuit means in each signal channel for converting pulse type signal outputs of nanoseconds duration into signals of at least sufficient duration as to provide sufficient time for comparison of the signals in the pair of channels, difference amplifier means connnected to receive the output of said channels, and serving to compare the outputs to produce a steering command output, the polarity of which is indicative of the channel having the higher output, such steering command having a slope representing volts versus target bearing that is independent of input signal level, thus inherently accomplishing normalization, and limiter means for limiting the output of said difference amplifier means to a preselected voltage level below a non-linear region of said output.

15. The signal processor as defined in claim 14 in which said detector means is a quadrant type optical detector.

16. The signal processor as defined in claim 14 in which said detector means is a radio frequency antenna array.

17. The signal processor as defined in claim 14 in which said difference amplifier means produces a steering command output signal, the amplitude of which is proportional to the magnitude of the difference of the outputs of said channels.

18. A proportional type signal processor having a wide instantaneous dynamic range and usable in conjunction with one or more pairs of channels, in which each pair relates to the same sensing plane, comprising detector means, with the channels of each pair of channels being arranged to receive outputs from said detector means, amplifier means including logarithmic amplifiers operatively disposed in each pair of said channels, arranged to receive the respective outputs of said detector means and functioning to amplify a wide range of signal levels, difference amplifier means connected to receive the output of each pair of said channels, and serving to produce signals the polarity of which is indicative of the channel of each pair of channels that has the higher output, such that appropriate commands can be generated, automatic gain control means having input means connected to receive outputs from said channels, said automatic gain control means being operative for selectively changing the gain of said amplifier means such that each logarithmic amplifier of each pair of said channels can function at a desired point of its operating characteristic, and means controlling the operation of said automatic gain control means so as to prevent on a pulse-to-pulse basis, any inputs to said automatic gain control means unless such inputs exceed a certain voltage level.

19. The proportional type signal processor as defined in claim 18 in which means are provided for furnishing a hold off bias preventing the development of automatic gain control until the average target signal amplitude reaches an operating point located substantially at the midpoint of the instantaneous dynamic range of said logarithmic amplifiers.

20. The proportional type signal processor as defined in claim 18 in which said means for controlling the operation of said automatic gain control means includes an OR gate subject to a hold off bias that prevents the passage of any inputs below a certain voltage level.

21. The signal processor as defined in claim 18 in which said commands are steering commands, said signal processor including means utilized for accomplishing normalization, said means serving to maintain a constant amplitude steering command for the constant ratio of target signal powers produced in the two pairs of channels by a given target displacement from the boresight axis, and independent of target signal level.

22. A signal processor having wide instantaneous dynamic range and usable in conjunction with a pair of channels relatable to the same sensing plane, comprising detector means, at least one pair of channels arranged to receive outputs from said detector means, amplifier means including preamplifier means and logarithmic amplifier means operatively disposed in each of said channels, arranged to receive respective outputs of said detector means and functioning to amplify a wide range of signal levels, sample and hold means in each of said channels for converting pulse type signals into longer duration signals required for subsequent signal processing, difference amplifier means connected to receive the output of said channels, and serving to produce a signal the polarity of which is indicative of the channel having the higher output, such that appropriate command signals can be generated, OR gate means also connected to receive the output of said channels, and automatic gain control means, said automatic gain control means having input means connected to receive the output of said OR gate means, and output means connected to said preamplifier means, for controlling the gain thereof, the operation of said OR gate means being controlled by a hold-off bias, such that no signal can pass through said OR gate means to assert control upon said automatic gain control means until the output of the stronger of the two channels reaches the midpoint of the operating range of the logarithmic amplifier means, said automatic gain control means upon receiving a signal passing through said OR gate means, then serving to control the gain of said preamplifier means such as to maintain the average of the sample and hold outputs at a substantially constant amplitude, thus allowing subsequent signals passing through said sample and hold means to vary on a pulse-to-pulse basis by a factor of $\pm \frac{1}{2}$ the instantaneous dynamic range from the average value relative to the automatic gain threshold, without degradation of the command signals generated.

23. A proportional signal processor having approximately a 60 db instantaneous dynamic range and usable in conjunction with a pair of channels relatable to the same sensing plane, comprising detector means, at least one pair of channels arranged to receive outputs from said detector means, amplifier means including preamplifier means and logarithmic amplifier means operatively disposed in each of said channels, arranged to receive respective outputs of said detector means and functioning to amplify a wide range of signal levels, sample and hold means in each of said channels for converting pulse type signals into longer duration signals required for subsequent signal processing, difference amplifier means connected to receive the output of said channels, and serving to produce a signal the polarity of which is indicative of the channel having the higher output, such that appropriate command signals can be generated, OR gate means also connected to receive the output of said channels, and automatic gain control means, said automatic gain control means having input means connected to receive the output of said OR gate means, and output means connected to said preamplifier means, for controlling the gain thereof, the operation of said OR gate means being controlled by a hold off bias, such that no signal can pass through said OR gate means to assert control upon said automatic gain control means until the output of the stronger of the two channels is approximately 30 db above the threshold of operation of said logarithmic amplifier means, said automatic gain control means, upon receiving a signal passing through said OR gate means, then serving to control the gain of said preamplifier means such as to maintain the average of the sample and hold outputs at a substantially constant amplitude, thus allowing subsequent signals passing through said sample and hold means to vary on a pulse-to-pulse basis by a factor of ±30 db from the average value relative to the automatic gain threshold, without degradation of the command signals generated.

* * * * *